Aug. 24, 1954
C. J. COWAN
2,687,157
PLASTIC CONTAINER
Filed Dec. 10, 1948
2 Sheets-Sheet 1
FIG. 1.
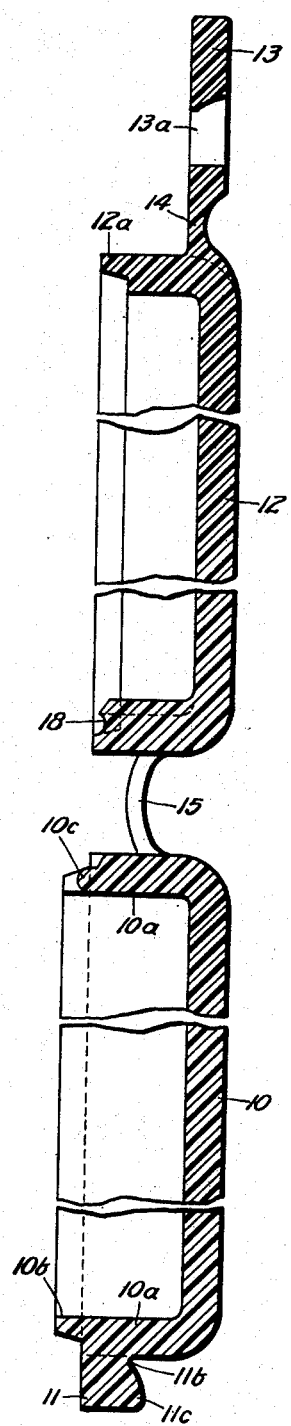
FIG. 2.
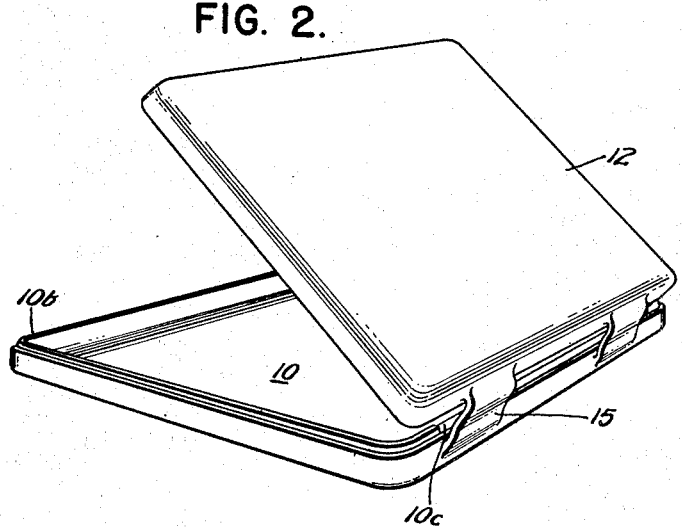
FIG. 3.
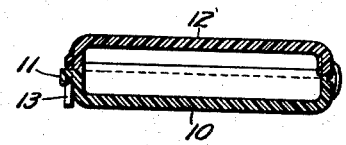
FIG. 4.
INVENTOR
C. J. COWAN
BY
his ATTORNEYS Aug. 24, 1954  C. J. COWAN  2,687,157
PLASTIC CONTAINER
Filed Dec. 10, 1948  2 Sheets-Sheet 2

INVENTOR
C. J. COWAN
BY Ward, Crosby & Neal
his ATTORNEYS

Patented Aug. 24, 1954

2,687,157

UNITED STATES PATENT OFFICE 2,687,157

PLASTIC CONTAINER

Clifton J. Cowan, Glen Ridge, N. J., assignor to Cowan Boyden Corporation, Providence, R. I., a corporation of Rhode Island Application December 10, 1948, Serial No. 64,526

4 Claims. (Cl. 150—0.5)

This invention relates to containers, and more particularly to methods and apparatus for forming a container of a plastic substance.

One of the serious problems in the plastic container art in the past has been the fabrication of a satisfactory hinge for top and bottom container sections. Such hinges in the past have been expensive relative to the cost of the container and in many instances the hinge has been the most expensive element of the entire container. One of the reasons for this is that considerable skilled labor has been necessary for hinge fabrication and installation. For example, after a top and a bottom section of a container have been fabricated, it has been necessary to join them in a separate hinging operation which requires separate handling of each part and a separate formation of a hinge. Such operations are time consuming and expensive. Moreover, many prior hinges suggested in the past are not satisfactory because of the possibility, for example, of the hinge pin or hinge spring becoming disengaged or the possibility of a cracking of the container adjacent the hinge.

The invention in one of its aspects comprises a novel plastic container having a base receptacle portion in combination with a top or cover member, and an interconnecting strap hinge integral therewith. The strap hinge is of the same material as the base receptacle and cover member and is formed substantially simultaneously therewith. The novel container is formed of a thermoplastic synthetic resin selected from the group consisting of polyethylene or of vinyl resins characterized in that: (1) when such substances are of a desired thickness for the strap hinge they are solids of good flexibility and tensile strength and of high resistance to fatigue failure; (2) adequate rigidity is obtainable for the base and cover sections of the container with a relatively small thickness which, of course, usually is greater than the hinge thickness.

According to the present invention, method and apparatus are provided for overcoming the above-mentioned difficulties.

Various further and more specific objects, features and advantages of the invention will clearly appear from the detailed description given below taken in connection with the accompanying drawings which form a part of the specification and illustrate, by way of example, preferred arrangements for carrying out the invention. It is to be expressly understood, however, that the drawings are for purposes of illustration only and are not intended as a definition of the limits of the invention, reference for this latter purpose being had to the appended claims.

In the drawings,

Fig. 1 is a side elevation in section and with parts broken away of a container embodying the present invention;

Fig. 2 is a perspective view of the container shown in Fig. 1;

Fig. 3 is a sectional view of the container shown in Fig. 1 with the parts thereof in a closed position;

Fig. 4 is a plan view of the novel container with top and bottom sections spread apart;

Figure 5:
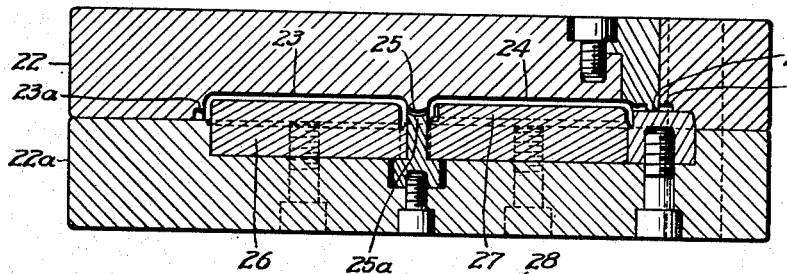
Fig. 5 is a side elevation partly in section and with parts broken away of a mold in which the novel container is formed.

Referring to the drawings in further detail, a novel container embodying the invention is shown in Figs. 1–4, inclusive, which container comprises a base receptacle portion, a top or cover portion with a strap hinge connecting same to the base receptacle, all molded in one integral piece. I have discovered that a container made of a thermoplastic synthetic resin selected from the group consisting of polyethylene or of vinyl resins having the characteristics set forth above is perfectly suited to this purpose because the resistance of the hinge portion to fatigue failure is sufficiently high and the substance is adapted for very rapid molding techniques. Moreover, with a desired relatively low thickness of the top and base sections of the container adequate rigidity is obtained. Completed plastic containers of a nature indicated in said figures can be molded, in accordance with a method to be described hereinafter, at speeds heretofore not remotely possible of attainment. The extremely high speed with which the novel container can be made, of course, is significant in that it reduces the cost of the container to a fraction of the cost of comparable containers heretofore manufactured. The reason for this, of course, is that the hinge is molded integral with the base receptacle and the cover member and simultaneously therewith. Furthermore a nib can be formed integral with either the base or the cover member for cooperation with a tab having a suitable perforation for cooperation with the nib whereby a positive closure of the container can be had.

Referring to the drawings, the novel container is constituted by a base portion 10 which, for example, can be adapted for containing such substances as medicinal tablets. The base receptacle and its integral parts are fabricated of one of the above-described substances.

The base receptacle 10 is provided with suitable side walls 10a having an upper lip 10b which, for example on three sides thereof is adapted for cooperation with analogous overlapping lip portions upon the top or cover member. On the fourth side adjacent the hinge, to be described hereinafter, the lip preferably is rounded as at 10c for cooperation with a suitable grooved portion in the top member which, by virtue of its rounded cross-section is adapted for angular motion upon the rounded lip 10c.

A nib 11 is formed integral with the base receptacle member 10 (Fig. 1) which nib is adapted for cooperation with a closure tab to be described more fully hereinafter. The nib 11 preferably forms with the front side wall 10a a groove 11b by virture of a protuberance 11c in the lower edge thereof by which a hooking action can be achieved with the above-mentioned tab.

The top or cover member is indicated as at 12 and, in the form shown, is generally similar in conformation to the base portion with the exception that it is somewhat more shallow and is provided with lip portions 12a for overlapping the lip portions 10b of the base receptacle 10.

Molded integrally with the top or cover member 12 is an angularly shiftable tab 13 which preferably is provided with a perforation 13a adapted to cooperate with the nib 11 whereby the outer extremity of the tab can fit over and hook under the nib 11 thereby fastening the cover 12 in a closed position.

The tab 13 preferably is of relatively small thickness as at 14 near the point of juncture with the top or cover member. The thickness at this point for small containers is preferably of the order of between .012 to .025 inch. The thickness of main body of tab 13 preferably is greater than that at point 14. The thickness of the tab 13, except at point 14, is, for example, approximately .043 inch.

The base receptacle 10 and the cover member 12 are joined by a novel hinge 15 which is formed integrally and substantially simultaneously therewith. In the form shown, the thickness of the hinge is of the order of between about .012 to .025 inch. The special qualities of the material of which this container is made adapt same for the simultaneous molding and the formation as one integral piece of said cover member 12, the base receptacle 10 and the hinge 15. Said substance is highly resistant to fatigue failure caused by the bending of the hinge, it is sufficiently flexible to permit easy opening and closing, and moreover, the qualities of rigidity of the various parts of the container and its hinge can be easily controlled by governing the thicknesses thereof. For example, as shown the thickness of the sides of the top member 12 and the base member 10 is about .047 inch which provides adequate rigidity for the purposes of this container.

The points at which the hinge 15 joins the side walls of the base receptacle 10 and the top member 12, in the form shown, are intermediate the upper and lower edges of the adjacent side walls as viewed in Fig. 1. However, it is, of course, possible to move the juncture points to different locations between said limits.

As shown in Fig. 4, there are two hinges 15, one near each extremity of the hinged side. Of course, one or a plurality of hinges can be employed.

The hinges 15 preferably are arched, as shown in Fig. 1, in such a manner that when the container is closed, as shown in Fig. 3, the inner portions of said hinges are under compression by virtue of the conformation of the hinge in the closed container position, and the outer portions of the hinge are under tension. Thus there is a force acting to open the container because of the tension upon said outer portion and the compression upon said inner portion of the hinges. Consequently when the tab 13 is disengaged from the nib 11 (Fig. 3), there will be a tendency for the container to spring open.

The length of the hinges 15 is adapted for positioning the top or cover member in a proper closing relationship to the base receptacle member 10 when the former is brought to a closed position or is angularly shifted toward a closed position.

Regarding the shape of the upper lip of the base receptacle and the top cover member, reference is had to Fig. 4 wherein the upper lip 10b of base receptacle 10 extends from a point 16 clockwise around the peripheral lip to a point 17. That portion of the lip directly between the points 17, 16 is constituted by the portion having a rounded cross-section 10c, as described above, which portion is adapted for cooperating with a groove in a corresponding portion of the cover member.

Such a corresponding grooved portion is indicated at 18 (Fig. 1) which groove extends directly between points 19 and 20. The flange or lip 12a is formed upon the cover member 12 for fitting over and cooperating with the lip 10b, as above mentioned. The cooperating lip portions 10b, 12a and 10c with its cooperating groove 18 may be formed in such a manner as to make the container substantially fluid tight.

A mold for the injection molding of the container described above is indicated in Figs. 5-7, inclusive, and, in the form shown, is constituted by a pair of cooperating sections 22, 22a (Fig. 5). These sections cooperate to form a cavity for forming the above-described base receptacle, the top or cover member and the integral hinge therebetween.

The section 22 is provided with a main recess 23 shaped for forming said base receptacle in cooperation with certain portions of the section 22a to be described below. Another recess 24 is also provided in the section 22 for shaping the cover member 12, also in cooperation with portions of the section 22a. Of course, if desired, suitable recesses as at 23a and 24a can be provided for the formation respectively of the nib 11 and the tab 13 of the novel container.

In the form shown in Fig. 5, there is a protuberance or tongue portion 25 situated between the recesses 23 and 24, and which is adapted for assisting in shaping the hinge 15 in cooperation with a suitable portion 25a of the section 22a also to be described hereinafter. The invention, however, is not limited to such portions 25, 25a, it being possible to eliminate same and to form the hinge, for example, in alignment with the bottom of the base receptacle and the top of the cover member, if desired. Also it would be within the purview of the invention to form the hinge whereby the juncture points thereof are directly adjacent or attached to the upper lip portion of the base and the corresponding lip portion of the cover member. However, in the form shown, the strap hinges do not constitute any part of the lip structure.

The section 22a constitutes a complemental mold section which includes a first protruding portion 26 which, in the form shown, underlies and extends into said main recess 23 of said first section 22 whereby the base receptacle is shaped. A second protruding portion 27 extends into the recess 24 of the first section for shaping the cover member, and the third portion of the mold section 25a, intermediate said first two-named protruding portions, extends therebetween into cooperative relation with the above-mentioned tongue 25 whereby a hinge cavity is formed for shaping said hinge 15. The hinge cavities, there being two as shown in Fig. 6, place in communication the cavities respectively for the base receptacle and the cover member.

For the formation of the perforation 13a in the tab 13, a suitable protuberance as at 22b is provided upon the section 22 for cooperation with the section 22a.

It has been found desirable to inject the plastic material into the cavities of the mold through suitable so-called "runners" which constitute conduits leading, for example, to the hinge cavities. Such "runners" are indicated as at 28, Fig. 6.

Figure 6:
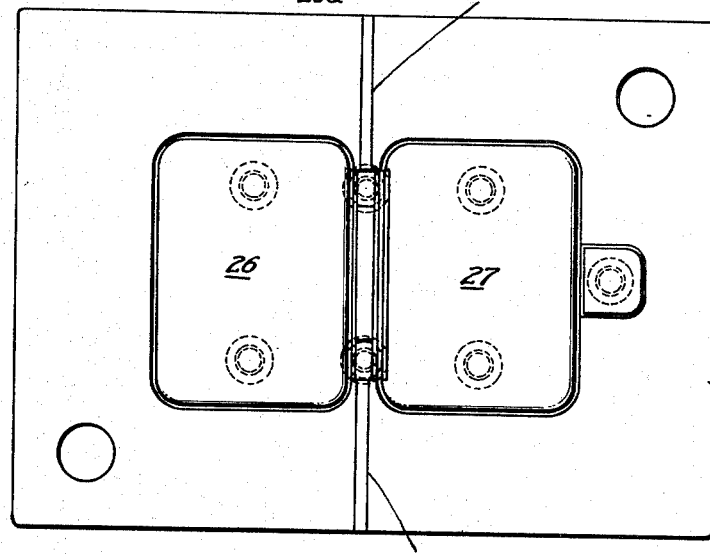
Fig. 6 is a plan view of one section of the mold of Fig. 5.
Figure 7:
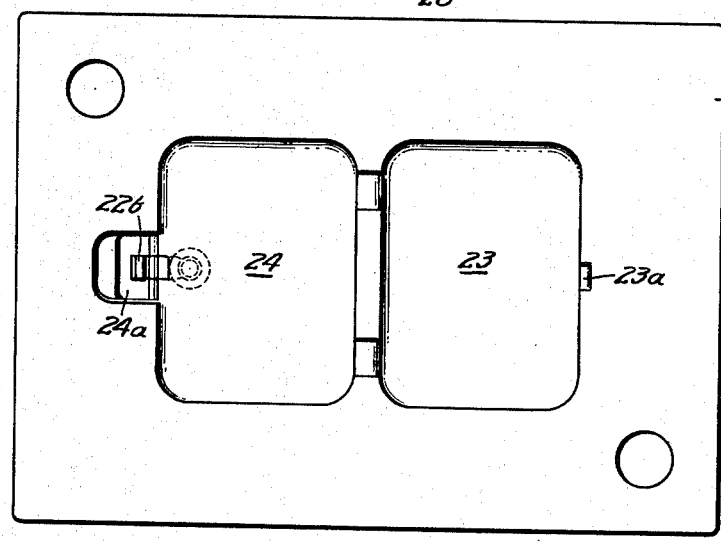
Fig. 7 is a plan view of the other section of the mold as shown in Fig. 5.

The invention in another aspect thereof is related to the novel method for forming a container out of the substances above defined by means of the mold such as that shown in Figs. 5-7, inclusive. A container can be formed by this method having a base receptacle and a cover both of which are integral with a strap hinge of high resistance to fatigue failure by: (a) heating the substance to a temperature between about 350° F. and 575° F.; (b) thereafter applying heat to the mold to heat same to a temperture of between about 80° F. and 190° F. (However, such application of heat is not necessary to the invention which is not limited thereto. Such heat application may be employed for producing a surface gloss on the finished product. If desired the mold can be only at room temperature); (c) the plastic substance after being heated as above mentioned is in the form of a flowable viscous mass and thereafter pressure is exerted thereupon to inject same into the mold and into said cavities to form said container; (d) thereafter the heat is removed, the substance solidifies and the container is formed; (e) thereafter the sections of the mold are separated and the so-called "gates" are removed and the container is completed.

The mold, as shown in Fig. 5, is of such conformation that the base receptacle and cover members are substantially in the same plane, that is, they are not angularly disposed relative to one another. This facilitates the molding of the container and assists in the separation of the completed product from the mold.

Thus by the novel method there is formed a container of a thermoplastic substance which is injection molded in a special mold which produces a container with top and bottom sections having a hinge integral therewith attached thereto and molded at the same time therewith. The hinge is molded without any superfluous fabrication operations. It is formed extremely rapidly and cheaply and solves the problem raised by the past high expense of hinging a plastic container.

The unit cost of such containers, of course, depends upon the cost of the materials from which it is formed. In view of the very low cost of the substances set forth herein from which the device is formed, it is possible to fabricate containers at prices heretofore not possible of attainment. The elimination of the hinging operation, together with the great speed of the novel method defined herein, makes it possible to produce containers under extraordinarily advantageous circumstances.

While the invention has been described with respect to certain preferred examples which have given satisfactory results, it will be understood by those skilled in the art, after understanding the invention, that various changes and modifications may be made without departing from the spirit and scope of the invention, and it is intended therefore in the appended claims to cover all such changes and modifications.

What is claimed as new and is desired to be secured by Letters Patent is:

1. A container having self-supporting base and cover sections having adjacent side walls characterized by a strap hinge interconnecting same and integral therewith, said strap hinge joining said base and cover sections each along a line intermediate the upper and lower edges of such side walls, said container being composed of a thermoplastic synthetic resin selected from a group consisting of polyethylene and characterized in that it is a flexible solid having high resistance to fatigue failure.

2. A box comprising a one-piece plastic molding having the properties of elasticity and flexibility, including a receptacle, a lid and a hinge connecting the lid to the receptacle, the receptacle and the lid each having side walls that meet along confronting edges when the lid is in closed position, and the hinge comprising a web that extends outwardly from corresponding walls of both the receptacle and lid at regions spaced from the confronting edges to provide a substantial length of bowed material spaced from the walls of the receptacle when the lid is closed.

3. A one piece molded container formed of thermoplastic material and including a hollow case portion having a bottom wall and a side wall, a cover portion having a top wall and a side wall, said side walls having a parting line when the cover is closed on the case, and a connecting hinge portion integrally molded at opposite ends to said cover and case, and wherein at least one of the hinge connections with the case and cover is spaced away from said parting line and said hinge portion is looped away from the case and cover when the latter is closed.

4. A one piece molded container formed of thermoplastic material and including a hollow case portion having a bottom and a side wall, a cover portion having a top and a side wall, and a connecting hinge portion integrally molded to said cover and case and looping away from the latter when closed.

References Cited in the file of this patent
UNITED STATES PATENTS

| Number | Name | Date |
|---|---|---|
| 557,461 | Welander | Mar. 31, 1896 |
| 1,498,335 | Von Hambach | June 17, 1924 |
| 1,958,466 | Boyd | May 15, 1934 |
| 1,975,127 | Sherman | Oct. 2, 1934 |
| 2,078,488 | Farnham | Apr. 27, 1937 |
| 2,168,822 | Fink | Aug. 8, 1938 |
| 2,227,966 | Emsley | Jan. 7, 1941 |
| 2,375,645 | Gordon | May 8, 1945 |
| 2,487,400 | Tupper | Nov. 8, 1949 |

OTHER REFERENCES

Modern Plastics, "Saran for Injecting Molding," October 1942, pages 67–71, 118 and 120.

Plastics, "Polyethylene," September 1944, pages 39, 40, 42, 43 and 100.